(12) United States Patent
Mangrulkar et al.

(10) Patent No.: US 12,615,544 B2
(45) Date of Patent: Apr. 28, 2026

(54) TRAFFIC TYPE AWARE SLICE MANAGEMENT

(71) Applicant: T-Mobile Innovations LLC, Overland Park, KS (US)

(72) Inventors: Sandeep Mangrulkar, Chantilly, VA (US); Eshwar Narava, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 588 days.

(21) Appl. No.: 18/149,256

(22) Filed: Jan. 3, 2023

(65) Prior Publication Data

US 2024/0224111 A1      Jul. 4, 2024

(51) Int. Cl.
*H04W 28/02* (2009.01)
(52) U.S. Cl.
CPC ............................... *H04W 28/0268* (2013.01)
(58) Field of Classification Search
CPC ................................................ H04W 28/0268
See application file for complete search history.

(56) References Cited

U.S. PATENT DOCUMENTS

| | | | | |
|---|---|---|---|---|
| 11,297,539 | B1 | 4/2022 | Sevindik et al. | |
| 11,356,854 | B2 | 6/2022 | Futaki et al. | |
| 2013/0252660 | A1* | 9/2013 | Bach ................. | H04W 36/0058 |
| | | | | 455/525 |
| 2014/0078898 | A1* | 3/2014 | Anchan ............. | H04W 36/0066 |
| | | | | 370/230 |
| 2015/0146554 | A1* | 5/2015 | Bali ...................... | H04W 24/08 |
| | | | | 370/252 |
| 2020/0413422 | A1* | 12/2020 | Jia ........................ | H04W 72/543 |
| 2023/0189131 | A1* | 6/2023 | Huang .............. | H04W 28/0268 |
| | | | | 370/328 |

* cited by examiner

*Primary Examiner* — Huy D Vu
*Assistant Examiner* — Bao G Nguyen
(74) *Attorney, Agent, or Firm* — Jones Burke PLLC

(57) ABSTRACT

Systems and methods are provided for traffic aware slice management in a wireless network. A method includes receiving a request from a wireless device at an access node and tagging the request at the access node with a priority. The method additionally includes transmitting the tagged request to a policy mapper of a core network and receiving a policy from a core network policy mapper based on the tagged request. The method further includes scheduling the request based on the received policy.

20 Claims, 6 Drawing Sheets

200

201 — NETWORK

210

206

ACCESS NODE

220 — PROCESSOR

230 — TRAFFIC TAGGING PROCESSOR

212 — MEMORY

213 — TX / RX

214 — ANTENNA

215 — SCHEDULER

216

218

POLICY MAPPER 400

COMMUNICATION
INTERFACE
420

PROCESSING SYSTEM
405

STORAGE
415

PROCESSOR
410

USER
INTERFACE
425

500

ACCESS NODE RECEIVES
REQUEST FROM WIRELESS
DEVICE
510

TAG REQUEST WITH A PRIORITY
520

FORWARD TAGGED REQUEST TO
CORE
530

RECEIVE POLICY FROM CORE
540

SCHEDULE REQUEST BASED ON
POLICY
550

600

RECEIVE TAGGED REQUEST
610

ASSIGN POLICY TO TAGGED
REQUEST WITH  POLICY MAPPER
620

TRANSMIT THE ASSIGNMENT TO
THE ACCESS NODE
630

TRAFFIC TYPE AWARE SLICE MANAGEMENT

TECHNICAL BACKGROUND

A wireless network, such as a cellular network, can include a core network and a radio access network (RAN) serving multiple wireless devices or user equipment (UE) in a geographical area covered by a radio frequency transmission provided by the access network. As technology has evolved, different carriers within the cellular network may utilize different types of radio access technologies (RATs). RATs can include, for example, third generation (3G) RATs (e.g., WCDMA, UMTS, CDMA etc.), fourth generation (4G) RATs (e.g., WiMax, LTE, etc.), and fifth generation (5G) RATs (new radio (NR)). Further, different types of access nodes may be implemented within the access network for deployment for the various RATs. For example, an eNodeB may be utilized for 4G RATs and a gNodeB may be utilized for 5G RATs. Deployment of the evolving RATs in a network provides numerous benefits. For example, newer RATs may provide additional resources to subscribers, faster communications speeds, and other advantages.

The evolution of 5G RATs has resulted in significant network architectural developments. For example, the 5G core network offers a serviced based architecture (SBA). The 5G core network is delivered through a set of interconnected network functions (NFs). The NFs are able to access the services of the other NFs in the core network. This is contrast to the 4G LTE evolved packet core, which implemented a fixed-function, hard-wired architecture.

Despite the developments in the core network, allocation of core resources such as physical resource blocks (PRBs) is typically controlled by an access node scheduler in the RAN. Such allocation is generally based on bandwidth demand. Thus, the resources of the core network are allocated based on resource partitioning or traffic demand.

However, different traffic types have different priorities and current scheduling approaches fail to maintain packet type priority across the core as no priority information is sent from the access node to the core elements. The failure to maintain packet type priority across the core elements may lead to a degradation in performance for particular traffic types or users. Accordingly, a solution is needed for maintaining packet type priority across network elements in order to maintain quality of service based on packet type priority.

Overview

Exemplary embodiments include a method for controlling implementation of network policies in a wireless communication network including a core network and a radio access network (RAN). In one exemplary embodiment, the method includes receiving, at an access node, a request from a wireless device and tagging the request at the access node with a priority. The method additionally includes transmitting the tagged request to a policy mapper of a core network and receiving a policy from a core network policy mapper based on the tagged request. The method additionally includes scheduling the request based on the received policy.

Exemplary embodiments additionally include a system for traffic aware slice management including an access node receiving requests from wireless devices. The access node additionally includes a tagging processor, the tagging processor tagging the received requests with a traffic type. The core network receives the tagged requests from the access node. A policy mapper of the core network associates the tags with a predetermined policy and transmits the predetermined policy to the access node in response to receipt of the tagged request. The access node schedules the request based on the predetermined policy received from the policy mapper of the core network.

Exemplary embodiments further include a centralized policy mapper. Exemplary embodiments of the centralized policy mapper include a memory storing a policy map and a processor performing multiple steps. The multiple steps include receiving a tagged request from an access node, matching the tagged request with a policy from the stored policy map, and transmitting the stored policy for the tagged request to the access node. The stored policy allocates at least one network slice to the tagged request.

DETAILED DESCRIPTION

Figure 1:
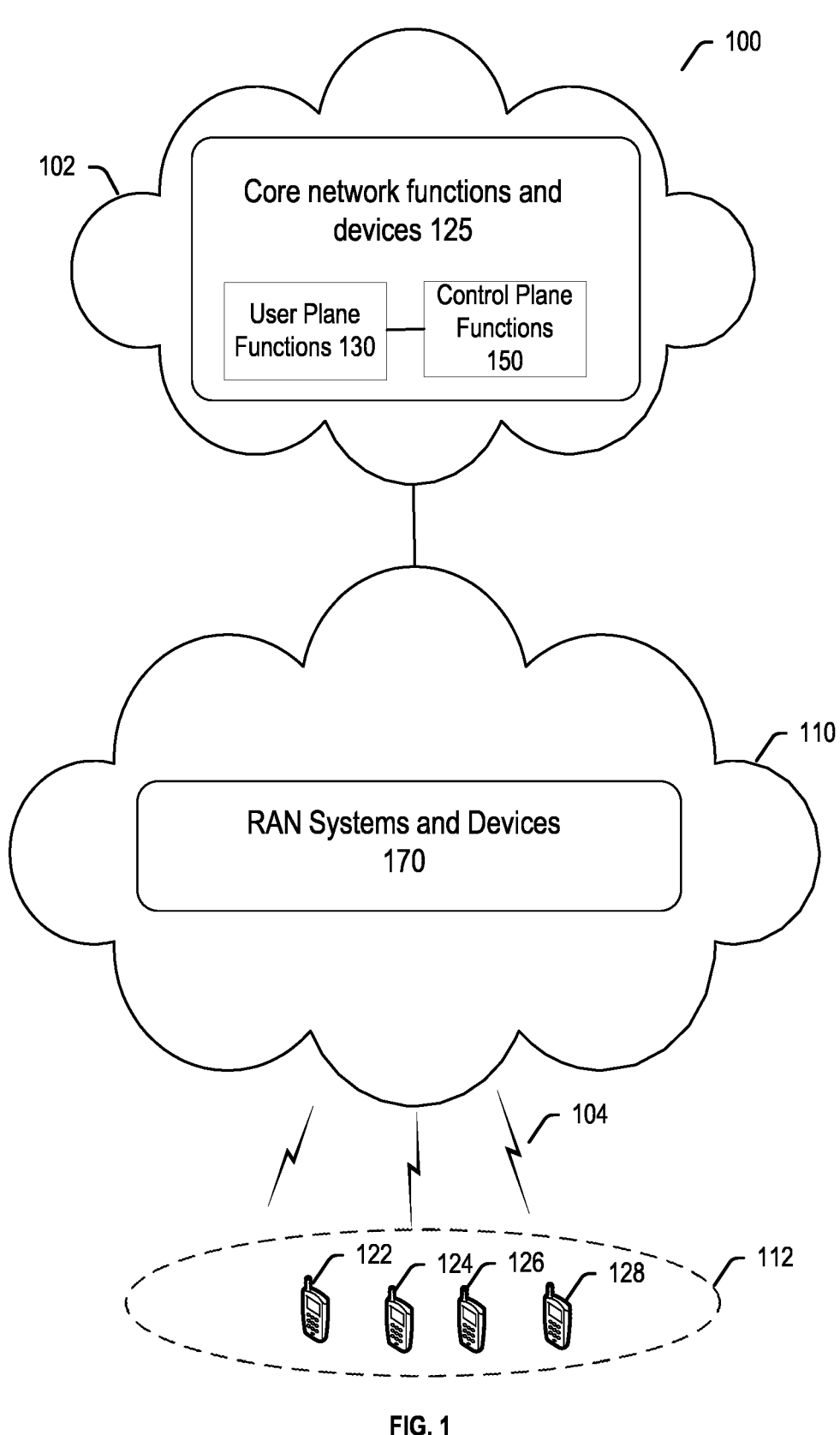
FIG. 1 depicts an exemplary system for wireless communication, in accordance with the disclosed embodiments.

Exemplary embodiments described herein include systems, methods, and components for traffic aware slice management within a wireless network. Embodiments disclosed herein include a tagging processor located at an access node receiving requests from wireless devices. The tagging processor tags the received requests with a priority, for example, using a quality of service class identifier (QCI). The access node transmits the tagged request to the core network. At the core network, a policy mapper receives the tagged request and matches the tag with a policy. The core transmits the policy to the access node and a scheduler of the access node schedules the request based on the selected policy.

In particular, exemplary embodiments relate to the utilization of slice or container allocation based on a priority tag such as QCI. Because some traffic has a higher priority than other traffic, the higher priority traffic requires a greater slice in order to maintain satisfactory performance. In embodiments set forth herein, settings are added to an access node scheduler for physical resource block (PRB) allocation, which can be a percentage of total PRBs or an absolute number. In order to maintain priority across all network elements in the core and the RAN, a tagging processor of the access node initially tags the traffic when a request from a wireless device is received. All network elements are configured to understand the traffic tagging performed and will allocate or reserve the resources corresponding to the tagged traffic.

Embodiments described herein operate to improve slice management in a 5G network. In 5G networks, the core network includes multiple virtual and containerized components in a cloud based environment. In embodiments proposed herein, a packet type priority is maintained across network elements, including those in the core network Thus, the components do not treat all traffic as the same traffic type as the tagging serves to identify certain traffic types, such as, e.g., guaranteed bit rate (GBR) traffic, which are sensitive to latency and bandwidth.

In addition to GBR traffic, other types of high priority traffic may include, for example, voice over LTE (VoLTE) traffic or other types of traffic that is latency and bandwidth sensitive. Further, upon the occurrence of a specific event, some types of traffic may achieve a higher priority status. For example, during a natural disaster, first responder personnel traffic may become critical and may be defined as a traffic type with elevated priority. Accordingly, based on a tag affixed by the access node, the core network may provide an enhanced slice for the first responder traffic. The enhanced slice can be defined based on total resources, for example, based on a percentage of total resources.

Additionally, in some instances traffic priority may be defined by a specific wireless plan. For example, in densely populated environments, such as sporting events or concerts, predefined wireless plans may have their data tagged as high priority. These predefined wireless plans may be characterized by guaranteed bandwidth and guaranteed latency. Accordingly, quality of service maintenance is ensured from the core.

Thus, embodiments described herein identify a traffic type at an access node. Components of the core network are aware of the different types of traffic that will be identified by tagging and allocate one or more slices, based on a stored policy, to the tagged traffic. In some embodiments, the core network components may allocate more than one slice and/or more than one policy to a particular category of traffic.

Thus, methods disclosed herein include receiving a request from a wireless device at an access node and tagging the request at the access node with a priority. The tagging may include, for example, tagging the request with a quality of service class identifier (QCI). In embodiments provided herein, the tagging is based on a latency and bandwidth sensitivity of the request. Thus, the tagging may be based on a traffic type and a priority of the traffic type. In some embodiments, the traffic types include at least one of a guaranteed bit rate (GBR) traffic type, a voice over long term evolution (VoLTE) traffic type and a first responder traffic type.

Methods disclosed herein further include transmitting the tagged request to a policy mapper of a core network. The policy mapper may for example be provided within a policy control function (PCF) of the core network. The request is evaluated at the policy mapper to match the tagged request with one or more predetermined policies that allocate one or more network slices to the tagged request. Methods further include receiving, at the access node, a policy from a core network policy mapper. The method may additionally include scheduling the request at a scheduler of the access node based on the received policy.

Similarly, a system is provided encompassing both access node components and core network components. The access node may for example include a tagging processor tagging the received requests. The core network includes a policy mapper associating the tags with a predetermined policy allocating one or more network slices and transmitting the predetermined policy to the access node in response to receipt of the tagged request. The policy mapper may include a memory storing a policy map and a processor implementing the policy map to match the tagged request with one or more policies. The access node of the system schedules the request based on the predetermined policy received from the policy mapper of the core network.

Further, the access node may be provided with predetermined settings operating in conjunction with the received policies from the core network.

FIG. 1 depicts an exemplary system 100 for wireless communication, in accordance with the disclosed embodiments. The system 100 may include a core network 102, a radio access network (RAN) 110 and multiple wireless devices 122, 124, 126, and 128 able to communicate within the network. The wireless devices 122, 124, 126, and 128 may be end-user wireless devices and may operate within one or more coverage areas 112 and communicate with the RAN 110 over communication links 104, which may for example be 5G NR communication links, 4G LTE communication links, or any other suitable type of communication link.

Figure 3:
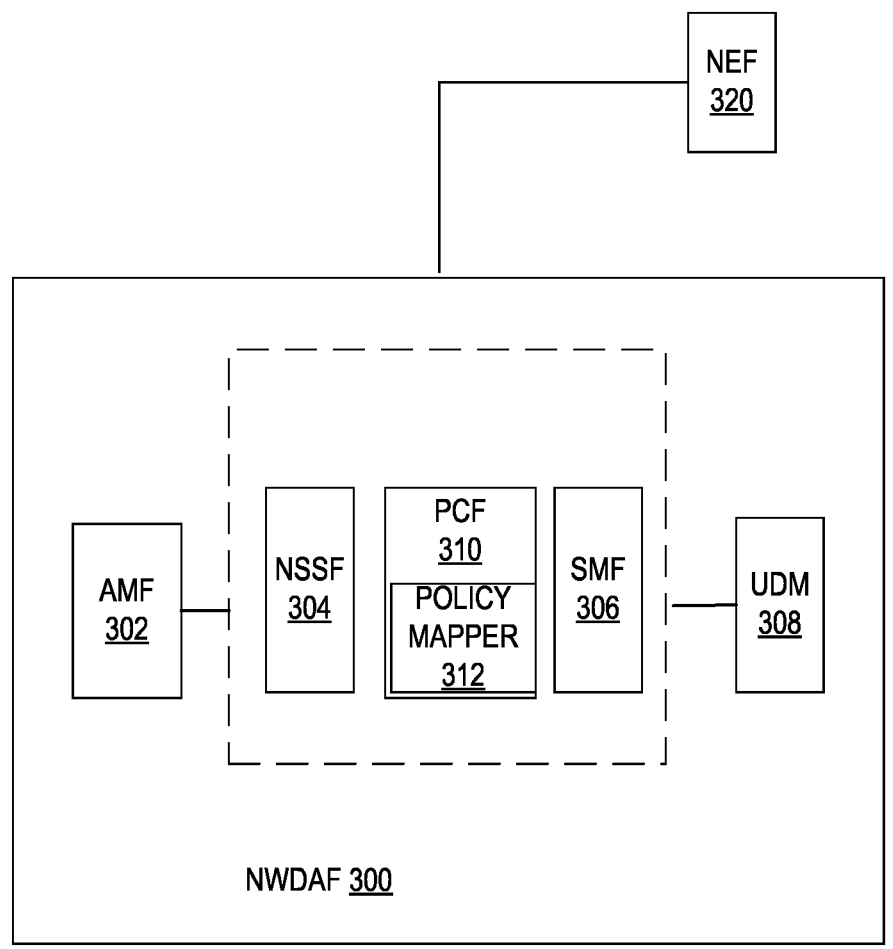
FIG. 3 is a block diagram illustrating core components in accordance with the disclosed embodiments.

The core network 102 includes core network functions and elements 125. The core network may be structured using a service-based architecture (SBA). The network functions and elements 125 may be separated into user plane functions 130 and control plane functions 150. Service-based interfaces may be utilized between control-plane functions, while user-plane functions connect over point-to-point links. Embodiments provided herein may utilize the control plane functions to match tagged traffic with a stored policy. FIG. 3, which is further described below, illustrates further details of the core network functions and elements 125.

The RAN systems and devices 170 may include various access network systems and devices 170. The RAN systems and devices 170 are disposed between the core network 102 and the end-user wireless devices 122, 124, 126, 128. Some of the systems and devices 170 may communicate directly with the core network 102 and others may communicate directly with the end user wireless devices 122, 124, 126, 128. Other systems and devices 172 may communicate with one another within the RAN in order to provide services from the core network 102 to the end-user wireless devices 122, 124, 126, and 128.

The RAN 110 includes at least an access node (or base station), such as an eNodeB, a next generation NodeB (gNodeB) communicating with a plurality of end-user wireless devices. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access nodes can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes may comprise a short range, low power, small-cell access node such as a microcell access node, a picocell access node, a femtocell access node, or a home eNodeB device. As will be further described below, functionality for tagging requests from wireless devices may be included within the access nodes.

Access nodes can be configured to deploy at least two different carriers, each of which utilizes a different RAT. For example, a first carrier may be deployed by an access node in an LTE mode, and a second carrier may be deployed by an access node in an NR mode. Thus, in an embodiment, the access node may comprise two co-located cells, or antenna/transceiver combinations that are mounted on the same structure. In some embodiments, multiple access nodes may be deployed and each access node may support a different RAT. For example, a gNodeB may support NR and an eNodeB may provide LTE coverage. Any other combination of access nodes and carriers deployed therefrom may be evident to those having ordinary skill in the art in light of this disclosure.

The access nodes can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. In embodiments disclosed herein, relay traffic may be tagged with an elevated priority.

Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 110 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for traffic type aware slice management may be implemented as computer-readable instructions or methods, and processing nodes on the network for executing the instructions or methods. The processing node may include a processor included in the access node or a processor included in any controller node in the wireless network that is coupled to the access node.

Figure 2:
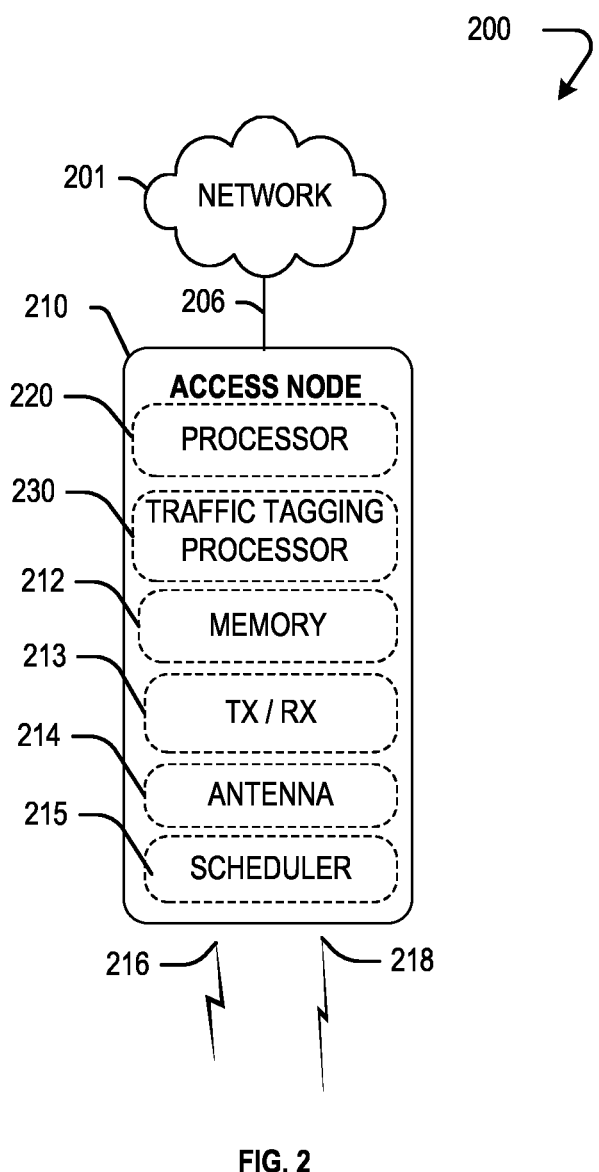
FIG. 2 illustrates an exemplary configuration of an access node in accordance with disclosed embodiments.

FIG. 2 illustrates an operating environment 200 for an exemplary access node 210 in accordance with the disclosed embodiments. In exemplary embodiments, access node 210 can include, for example, a gNodeB or an eNodeB. Access node 210 may comprise, for example, a macro-cell access node, such as access node 210 described with reference to FIG. 2. Access node 210 is illustrated as comprising a processor 220, a traffic tagging processor 230, a memory 212, transceiver(s) 213, and antenna(s) 214. Processor 220 executes instructions stored on memory 212, while transceiver(s) 213 and antenna(s) 214 enable wireless communication with other network nodes, such as wireless devices and other nodes. For example, wireless devices may initiate uplink transmissions such that the transceivers 213 and antennas 214 receive messages from the wireless devices, for example, over communication links 216 and 218 and pass the messages to a mobility entity in the core network. Further, the transceivers 213 and antennas 214 receive signals from the mobility entity such as a mobility management entity (MME) or access and mobility function (AMF) and pass the messages to the appropriate wireless device. Scheduler 215 may be provided for scheduling resources based on the presence and performance parameters of the wireless devices as well as based on policies transmitted from the core network. Network 201 may be similar to the network discussed above with respect to FIG. 1.

In embodiments provided herein, processor 220 may operate in conjunction with scheduler 215 and traffic tagging processor 230 to tag traffic with a priority. In operation, the traffic tagging processor 230 receives the requests from the wireless devices and tags the traffic, for example, with a quality of service class identifier (QCI). In embodiments provided herein, the traffic tagging processor 230 performs that tagging based on a latency and bandwidth sensitivity of the received request. Further, requests having different latency and bandwidth sensitivities may correspond to different traffic types. For example, the traffic type may be one of a guaranteed bit rate (GBR) traffic type, a voice over long term evolution (VOLTE) traffic type, a first responder traffic type, and a relay traffic type. The different traffic types may correspond to different QCIs.

As further explained herein, the access node 210 forwards the tagged traffic to the core network for policy mapping. In embodiments set forth herein, the core network assigns one or more policies including one or more network slices based on the tag affixed to the traffic. When the scheduler 215 receives the policies, it schedules the traffic in accordance with the received policies. Further, memory 212 may include settings used by the scheduler 215 to operate cooperatively with the received policies.

While the processor 220, the traffic tagging processor 230, and the scheduler 215 are shown as separate components, these components may optionally be integrated in various combinations. For example, the processor 220 may perform the functions described above with respect to the traffic tagging processor 230 by accessing stored instructions from the memory 212. Alternatively, the function of the traffic tagging processor 230 may be incorporated in the scheduler 215.

The access node 210 may utilize transceiver 213 and antenna 214 to communicate information, for example with the wireless devices and with the core network. For example, these components may receive requests from the wireless devices and further may receive instructions, such as policies, from the core network.

FIG. 3 illustrates an exemplary configuration of core network functions and elements 125 in accordance with disclosed embodiments. The functions and elements illustrated correspond to a network data analytics function (NWDAF) 300, which is designed to streamline the way core network data is produced and consumed and to enhance the user experience by improving performance and reliability. The NWDAF 300 is illustrated as including multiple components.

An access and mobility function (AMF) 302 receives connection and session related information from the wireless devices and is responsible for handling connection and mobility management tasks. A network slice selection function (NSSF) 304 can be used by the AMF 302 to assist with the selection of network slice instances that will serve a particular device. As such, the NSSF 304 determines allowed network slice assistance information that is supplied to the device. Moreover, the NSSF 304 may be used to allocate an appropriate AMF 302 if the current AMF 302 is not able to support all network slice instances for a given device.

In operation, the NSSF 304 cooperates with a policy control function (PCF) 310 and a session management function (SMF) 306 to manage policy and communicate the policy back to the RAN. The PCF 310 supports a unified policy framework to provide the appropriate policy rules to the control plane functions. In the illustrated embodiment, the PCF 310 includes a policy mapper 312. The policy mapper 312 may, for example, include information such as that provided in Table 1 below.

TABLE 1

| QCI | POLICY |
|---|---|
| QCI 1 | POLICY 1 |
| QCI 4 | POLICY 2 |
| QCI 7 | POLICY 3 |
| QCI 121 | POLICY 4 |
| OTHER QCI | POLICY 5 |

Thus, the policy mapper 312 pairs a tag, such as a particular QCI, with a policy. As illustrated in Table 1, different QCIs correspond to different policies. In some instances, QCIs including QCI 1, 4, 7, and 121 may correspond to policies directed at handling latency and bandwidth sensitive traffic. Thus, other QCIs may correspond to a default policy, such as policy 5, for handling all other traffic, which is not considered to be bandwidth or latency sensitive traffic. In operation, the PCF 310 utilizes the policy mapper 312 to determine an appropriate policy based on the tagged traffic received from the access node. Although the tags are illustrated as QCIs, other types of tags may be utilized. In embodiments disclosed herein, Policy 1 may be directed to a highest priority traffic and may allocate more than one network slice, whereas policy 5 may be directed to a lowest priority traffic and may allocate a portion of a network slice.

The session management function (SMF) 306 is primarily responsible for creating updating and removing sessions and managing session context. In operation, the NSSF 304, PCF 310, and SMF 306 function together to identify received tags and prioritize the tagged traffic based on the policy mapper 312.

A unified data management (UDM) function 308 provides services to other core functions, such as the AMF 302, SMF 306 and a network exposure function (NEF) 320. The UDM 308 may function as a stateful message store, holding information in local memory. Further, the NEF 320 provides a mechanism for securely exposing services and features of the core network. Other core functions and elements 125 may also be included as would be known to one skilled in the art.

Figure 4:
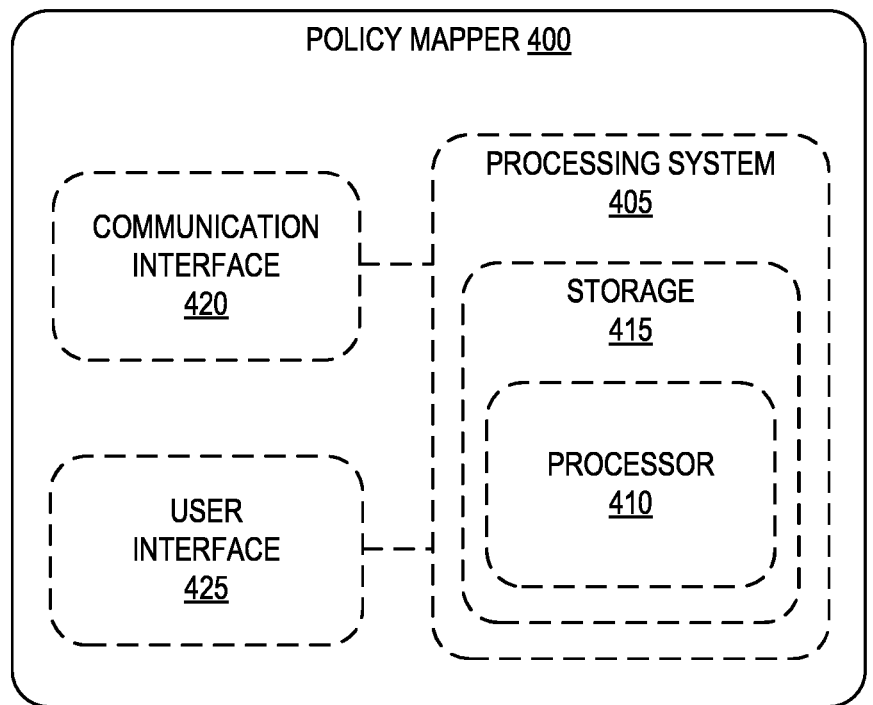
FIG. 4 is an exemplary policy mapper in accordance with disclosed embodiments.

FIG. 4 depicts an exemplary policy mapper 400, which may be configured to perform the methods and operations disclosed herein to provide traffic aware slice management in a wireless network. In the disclosed embodiments, the policy mapper 400 is a centralized policy mapper included in the core network 102.

The policy mapper 400 may be configured for assigning a policy to tagged traffic. To perform the assignment, the policy mapper 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes may be accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein, such as the information discussed above with respect to Table 1. Processor 410 may be a microprocessor and may include hardware circuitry and/or embedded codes configured to retrieve and execute software stored in storage device 415.

The policy mapper 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to policy mapper 400 and receive data or information from policy mapper 400. User interface 425 may include hardware components, such as touch screens, buttons, displays, speakers, etc. The policy mapper 400 may further include other components such as a power management unit, a control interface unit, etc.

Figure 5:
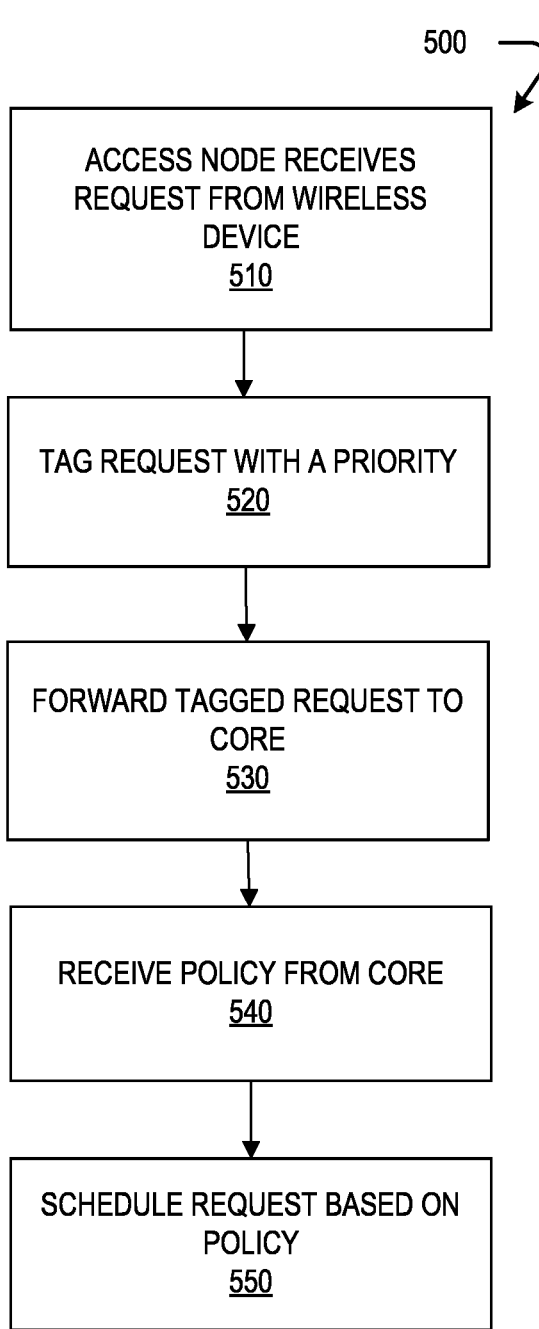
FIG. 5 is a flow chart depicting a method for traffic type aware slice management in accordance with disclosed embodiments.

FIG. 5 is a flow chart depicting an exemplary method 500 for traffic aware slice management. Method 500 may be performed by any suitable processor, for example, the traffic tagging processor 230 of the access node 210 as shown in FIG. 2. Specifically, FIG. 5 illustrates operation of the access node 210 in performing traffic aware slice management. However, it should be understood that the access node 210 operates in conjunction with the policy mapper of the core network in order to accomplish traffic aware slice management and further that specific components of the access node 210, such as the traffic tagging processor 230 and the scheduler 215 may perform the functions described herein.

In step 510, the access node 210 receives a request from a wireless device. The request from the wireless device may originate from a particular application or be affiliated with a wireless plan, or be a particular type of request that is associated with a predetermined priority. For example, requests from first responders, requests from business wireless plans, or requests for GBR or VoLTE services may be associated with a higher priority than standard requests.

In step 520, the access node 210 tags the request with a priority. For example, the access node 210 may tag the request with a particular QCI. For example, GBR requests may have a high priority and thus may be tagged, for example with QCI 1 or QCI 2. Lower priority requests may be associated with higher QCI values, such as, for example, QCI 7 or QCI 8. While embodiments herein utilize QCI as an indicator of priority, other indicators could alternatively or additionally be utilized. For example, any indicator of bandwidth or latency requirements could be utilized instead of QCI.

In step 530, the access node 210 forwards the tagged request to the core network, where the tag reaches the core components described above. Within the core network, the core components consult the policy mapper to select an appropriate policy for the QCI. The selected policy may allocate one or more network slices based on the QCI received from the access node 210.

In step 540, the access node 210 receives the selected policy from the core network and in step 550, the access node 210 schedules the request based on the received policy. For example, the access node 210 allocates PRBs to the request based on the received policy. In embodiments provided herein, the access node 210 may further consult stored settings from the memory 212 to operate cooperatively with the received policy. For example, the stored settings may include a percentage or number of PRBs that can be allocated and/or a threshold demands for particular QCI that allow for sharing by other traffic types when the demand for the particular QCI does not meet the threshold.

Figure 6:
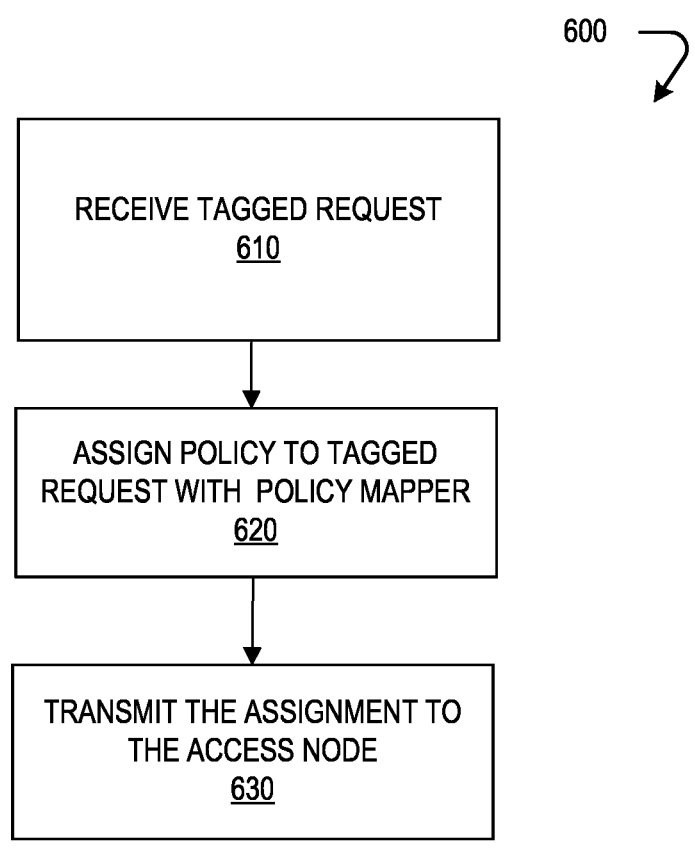
FIG. 6 is a flow chart depicting a further method for traffic type aware slice management in accordance with the disclosed embodiments.

FIG. 6 is a flow chart depicting a further exemplary method 600 for traffic aware slice management in accordance with embodiments disclosed herein. Method 600 may be performed by any suitable processor, for example, the processor 410 of the policy mapper 400 as shown in FIG. 5. Specifically, FIG. 6 illustrates the operation of the core network components during traffic aware slice management.

In step 610, the core network receives the tagged request from the access node 210. Specifically, the request may be received for example at the AMF 302 of the core network, which communicates the request to the NSSF 304.

In step 620, core network components including the policy mapper 312 of the PCF 310 assign a policy to the tagged request. In some embodiments, the policy mapper 312 may assign more than one policy to the tagged request. Each policy may assign one or more network slices to the request.

In step 630, the core network transmits the assigned policy including the one or more network slices to the access node 210. For example, the PCF 310 may communicate with the SMF 306, which will connect with the AMF 302. The AMF 302 communicates with the RAN, where policy selected policies are implemented.

In some embodiments, methods 500 and 600 may include additional steps or operations. Furthermore, the methods may include steps shown in each of the other methods. As one of ordinary skill in the art would understand, the methods 600 and 700 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. A method comprising:
receiving a request from a wireless device at an access node, the request associated with a traffic type;
tagging the request from the wireless device at the access node with a priority based on the traffic type and transmitting, by the access node, the tagged request to a policy mapper of a core network;

receiving a policy from a core network policy mapper based on the tagged request, the policy from the core network policy mapper allocating at least one network slice based on the priority of the tagged request; and scheduling the request at the access node based on the received policy allocating the at least one network slice.

2. The method of claim 1, further comprising utilizing a policy mapper in a Policy Control Function (PCF) of the core network.

3. The method of claim 1, wherein tagging the request with a priority comprises tagging the request with a quality of service class identifier (QCI).

4. The method of claim 3, further comprising tagging the request based on latency and bandwidth sensitivity of the request.

5. The method of claim 1, further comprising evaluating the tagged request at the policy mapper to match the tagged request with a predetermined policy.

6. The method of claim 5, further comprising tagging the received request with the traffic type.

7. The method of claim 1, further comprising identifying the traffic type at the access node.

8. The method of claim 7, wherein the traffic type is one of a guaranteed bit rate (GBR) traffic type, a voice over long term evolution (VoLTE) traffic type and a first responder traffic type.

9. A system comprising:

an access node receiving requests from wireless devices, the access node comprising a tagging processor, the tagging processor tagging the received requests from wireless devices with a priority selected based on a traffic type; and a core network receiving the tagged requests from the access node, the core network comprising a policy mapper associating the tags with a predetermined policy corresponding to at least one network slice and transmitting the predetermined policy corresponding to the at least one network slice to the access node in response to receipt of the tagged request, wherein the access node schedules the request based on the predetermined policy corresponding to the at least one network slice received from the policy mapper of the core network.

10. The system of claim 9, wherein the policy mapper is provided within a policy control function (PCF) of the core network.

11. The system of claim 9, wherein tagging the requests with a priority comprises tagging the requests with a quality of service class identifier (QCI).

12. The system of claim 11, wherein the tagging is based on latency and bandwidth sensitivity of the requests.

13. The system of claim 9, wherein the policy mapper evaluates the tagged request to match the tagged request with the predetermined policy.

14. The system of claim 9, further comprising identifying the traffic type at the access node.

15. The system of claim 9, wherein the tagging includes a traffic type.

16. A centralized policy mapper comprising:

a memory storing a policy map in a core network; and a processor in the core network performing steps including;

receiving a tagged request from an access node, the request originating from a wireless device and tagged with a priority by the access node based on a traffic type;

matching the tagged request with a policy from the stored policy map based on the priority; and transmitting the stored policy for the tagged request to the access node, the stored policy allocating at least one network slice to the tagged request.

17. The centralized policy mapper of claim 16, wherein the centralized policy mapper is disposed within a PCF of a core network.

18. The centralized policy mapper of claim 16, wherein the tagged request is tagged with a quality of service class identifier (QCI).

19. The centralized policy mapper of claim 18, wherein the tagged request is tagged based on latency and bandwidth sensitivity of the request.

20. The centralized policy mapper of claim 18, further comprising evaluating the tagged request at the policy mapper based on the QCI to match the tagged request with a predetermined policy.

* * * * *